(12) United States Patent
Ebeling et al.

(10) Patent No.: US 7,258,074 B2
(45) Date of Patent: Aug. 21, 2007

(54) METHOD FOR MACHINE MILKING AN ANIMAL

(75) Inventors: Michael Ebeling, Lemgo-Kirchheide (DE); Bernhard Schulze-Wartenhorst, Warendorf (DE); Olaf Suhr, Oelde (DE)

(73) Assignee: WestfaliaSurge GmbH, Bonen (DE)

( * ) Notice: Subject to any disclaimer, the term of this patent is extended or adjusted under 35 U.S.C. 154(b) by 0 days.

(21) Appl. No.: 10/380,736

(22) PCT Filed: Sep. 7, 2001

(86) PCT No.: PCT/EP01/10329

§ 371 (c)(1), (2), (4) Date: Jul. 22, 2003

(87) PCT Pub. No.: WO02/21907

PCT Pub. Date: Mar. 21, 2002

(65) Prior Publication Data

US 2004/0050330 A1    Mar. 18, 2004

(30) Foreign Application Priority Data

Sep. 18, 2000    (DE) ................................ 100 46 038

(51) Int. Cl.
*A01J 3/00*    (2006.01)
(52) U.S. Cl. .................................. 119/14.02
(58) Field of Classification Search ............. 119/14.02, 119/14.41, 14.47, 14.08
See application file for complete search history.

(56) References Cited

U.S. PATENT DOCUMENTS

| 4,011,838 | A | * | 3/1977 | Nordegren et al. | 119/14.08 |
| 4,190,021 | A | * | 2/1980 | Reisgies | 119/14.44 |
| 4,391,221 | A | * | 7/1983 | Hoefelmayr et al. | 119/14.08 |
| 4,790,261 | A | * | 12/1988 | Wartenhorst | 119/14.02 |
| 5,178,095 | A | * | 1/1993 | Mein | 119/14.47 |
| 5,443,035 | A | * | 8/1995 | Lind et al. | 119/14.02 |
| 5,697,323 | A | * | 12/1997 | Visigalli | 119/14.02 |
| 5,769,024 | A | * | 6/1998 | Ornerfors et al. | 119/14.02 |
| 5,931,115 | A | * | 8/1999 | Lind et al. | 119/14.02 |
| 5,970,910 | A | * | 10/1999 | Grimm et al. | 119/14.02 |
| 5,979,358 | A | * | 11/1999 | Ornerfors et al. | 119/14.02 |
| 6,651,583 | B1 | * | 11/2003 | Lind et al. | 119/14.02 |
| 2003/0111017 | A1 | * | 6/2003 | Wartenhorst | 119/14.02 |
| 2003/0145794 | A1 | * | 8/2003 | Van Der Lely et al. | 119/14.02 |
| 2004/0200423 | A1 | * | 10/2004 | Muirbrook | 119/14.02 |
| 2005/0126498 | A1 | * | 6/2005 | Bosma | 119/14.02 |

FOREIGN PATENT DOCUMENTS

| CA | 2184605 | 9/1995 |
| DE | 31 20 539 A1 | 4/1982 |
| DE | 33 23 676 A1 | 1/1984 |
| DE | 3621666 A1 | 1/1998 |
| DE | 19720487 A1 | 11/1998 |
| EP | 0032752 | 7/1981 |
| EP | 0 748 155 B1 | 7/1998 |
| WO | WO95/23501 | 8/1995 |
| WO | WO95/31095 | 11/1995 |

OTHER PUBLICATIONS

English language Abstract of EP 0 748 155 B1, European Patent Office's esp@cenet.com database, (1p).
English language Abstract of DE 31 20 539 A1, European Patent Office's esp@cenet.com database, (1p).
English language Abstract of DE 33 23 676 A1, European Patent Office's esp@cenet.com database, (1p).

* cited by examiner

*Primary Examiner*—Thomas Price
(74) *Attorney, Agent, or Firm*—Smith Law Office

(57) ABSTRACT

The invention relates to a method for machine milking an animal, particularly a cow, according to which a stimulation phase precedes a main milking phase, whereby during the entire stimulation phase, essentially no milk is withdrawn, and the duration of the stimulation phase is determined according to the amount of expected cisteral milk and/or alveolar milk.

20 Claims, No Drawings

METHOD FOR MACHINE MILKING AN ANIMAL

FIELD AND BACKGROUND OF THE INVENTION

The object of the invention refers to a method for machine-milking of an animal, especially a cow, with the characteristics of inserting a stimulation phase before a milking phase.

A method for machine-milking of an animal, especially a cow, is known from European Patent Document EP 0 032 752 A1, in which a stimulation phase is included before a milking phase, so that no milk is removed for a period of 40 to 90 seconds after the beginning of this stimulation phase and the removal of milk is begun only directly afterwards. This procedure is based on the consideration that removal of milk should begin only when the animal was made ready for milking and interested in milking by a complete milk ejection and a still high internal pressure in the udder.

Each milking species and each animal reacts very differently to the stimulation performed stimulation effectiveness also depends on the animal's lactation stage, so that a duration of 40 to 90 seconds, during which essentially no milk is removed, represents a compromise stimulation phase for all animals. It was found in practice that negative reactions can occur in animals from overstimulation. Such phenomena occur especially clearly at the beginning of the lactation phase of an animal. At the beginning of the lactation phase of the animal, the production level is very high, so that overstimulation as a result of long stimulation times could lead to an adverse effect on the milk production behavior of the animal.

A comparable problem occurs in the end of the lactation phase when the stimulation phase is chosen to be too short.

A method for machine milking of an animal is already known from German Patent Document DE 36 21 666 A1, in which the duration of the stimulation phase and the time ratio of the excitation phase and rest phase is determined as a function of the different stimulation requirements of the animals to be milked and thus the stimulation performed is individual for the animal. In case of individual stimulation of animals, the lactation stage of the animal is taken into consideration.

SUMMARY OF THE INVENTION

One goal of the present invention is to further develop the species-related method in such a way that the readiness of the animal to provide milk is increased even more.

This goal, according to the invention, is achieved by a method with the characteristics of performing a stimulation phase during which essentially no milk is used, and the duration of the stimulation phase is determined by the amount of milk in the animal's cistern and/or alveolar. Other advantageous further developments and embodiments of the method are described herein.

The method according to the invention for machine-milking of an animal, especially a cow, in which a stimulation phase is inserted before the main milking phase, where essentially no milk is removed starting from the beginning of the stimulation phase, characterized by the fact that essentially no milk is removed during the entire stimulation phase and the duration of the stimulation phase is determined as a function of a predicted amount of cistern milk and/or alveolar milk.

The method according to the invention takes into consideration the basic conditions of animal keeping and the frequency of milking. By the use of automatic milking system, the animal, especially a cow, has the possibility of searching out the automatic milking system by itself by milking up to six times daily. In such a situation, when the usual twice-daily milking is changed to more frequent milking, it can be found that the previous procedure for machine-milking is no longer satisfactory. The lack of cistern milk present in the udder is added to the consideration of determining the stimulation phase's duration. This leads to the fact that the stimulation times used for releasing oxytocin is no longer sufficient to provide continuous milking without breakdown in the milk flow. It is observed in practice that, after appropriate stimulation, although sufficient cistern milk is present in the first moment and thus the milking phase can be begun, after a short period of time, the cistern milk was completely removed, but the alveolar milk from the gland region is no longer available for machine-milking. As a result of this, a greatly reduced milk flow, which sometimes even goes to zero, results, with the phenomenon that, now the milking machine vacuum can enter through the teats into the udder, causing pain and indisposition of the animal. The penetration of vacuum into the udder has an adverse influence on the animal, namely resulting in a clear reduction in the willingness to be milked.

By taking essentially no milk during the entire stimulation phase, it is ensured that the cistern milk is not removed. The duration of the stimulation phase is variable, and is determined depending on the expected amount of cistern milk and/or alveolar milk. In this way, the lactation phase of the animal is also taken into consideration. When relatively large amounts of milk are given, the stimulation phase should be short. As the amount of milk becomes increasingly smaller, the duration of the stimulation phase can be increased.

Especially, it is proposed that, for the determination of the duration of the stimulation phase, the time span between at least last two successive milking processes be taken into consideration.

At a high production level of the animal, the percentage of the cistern milk and also the absolute amount of cistern milk present can be evaluated as being more favorable than at the end of the lactation when the production level becomes clearly lower. If the frequency of milking is changed, then the amount of cistern milk decreases greatly both at the beginning of lactation at a high production level, as well as toward the end of lactation. This leads to the fact that, with shorter times between milkings, the stimulation must take longer, in order that the alveolar milk can reach the cistern area as a result of the release of oxytocin and thus undisturbed milking can be achieved.

Preferably, this is achieved by the fact that during the stimulation phase, the frequency of pulsation is carried out with simultaneous reduction of the pressure change rate, which causes a reduction in the vacuum in the milk cup intermediate space. As a result of this advantageous conduction of the process, it is ensured that the teat opening is at least almost closed, so that essentially no milking of the cistern milk occurs.

No milk is drawn during the stimulation phase is achieved according to a further advantageous development of the method by the fact that a phase shift of the vacuum phase (B-pulse) is performed during the stimulation phase.

According to still another advantageous embodiment of the invention, it is proposed that, during the stimulation phase, the frequency of pulsation be increased.

The stimulation phase may also contain a stimulation section with increased frequency of stimulation with an almost closed teat opening, but after a predetermined time period, the frequency is reduced to zero and then a waiting time follows, in which no milk is removed.

The effect of the stimulation phase is preferably checked during the main milking phase. This can be done by suitable measuring equipment. Especially, it is proposed that the milk flow and the milk flow amount be measured as a function of time. These data can be used as initial data for the determination of the stimulation phase for a further milking process of the respective animal. These values may contain corresponding correction factors which, for example, take lactation into consideration.

The invention claimed is:

1. A method for machine-milking of an animal, especially a cow, comprising the steps of:
   predetermining a quantity of cistern milk to be obtained from an animal; and
   inserting a stimulation phase before a main milking phase, wherein substantially no milk is removed during the stimulation phase and wherein a duration of the stimulation phase is determined from the predetermined quantity of cistern milk.

2. The method of claim 1, wherein the duration of the stimulation phase is determined as a function of a time span between at least two previous successive milkings.

3. The method of claim 1, wherein a frequency of pulsation is increased with simultaneous reduction of a pressure change rate during the stimulation phase.

4. The method of claim 3, wherein the frequency of pulsation is increased during the stimulation phase.

5. The method of claim 1, wherein a phase shift of a vacuum phase is performed during the stimulation phase.

6. The method of claim 1 wherein, after a passive milking phase with increased frequency of milking pulsation, stimulation is applied to individual milk cups.

7. The method of claim 1 wherein the duration of the stimulation phase is determined according to a projected predetermined quantity of alveolar milk.

8. A method for machine-milking of an animal, comprising the steps of:
   predetermining an expected amount of milk to be obtained from an animal;
   determining a duration of a stimulation phase based on the predetermined expected amount of milk from the animal; and
   performing the stimulation phase before a main milking phase, wherein substantially no milk is removed during the stimulation phase.

9. The method of claim 8 wherein the expected milk is cistern milk.

10. The method of claim 8 wherein the expected milk is alveolar milk.

11. The method of claim 8 further comprising:
    measuring a time span value between a first milking and a second milking; and
    calculating the duration of the stimulation phase based on the time span value.

12. The method of claim 8, further comprising:
    increasing a frequency of milking pulsation during the stimulation phase.

13. The method of claim 12, further comprising:
    simultaneously reducing a pressure change rate while increasing the frequency of pulsation.

14. The method of claim 8, further comprising:
    performing a phase shift of a vacuum phase during the stimulation phase.

15. A method of machine-milking of an animal, comprising the steps of:
    predetermining an expected amount of milk to be obtained from an animal;
    determining a duration of a stimulation phase based on the expected amount of milk from the animal, wherein substantially no cistern milk is removed at the start of the stimulation phase; and
    performing stimulation during the stimulation phase with an almost closed teat.

16. The method of claim 15, further comprising:
    shortening the duration of the stimulation phase when a received amount of milk is high.

17. The method of claim 15, further comprising:
    lengthening the duration of the stimulation phase when a received amount of milk is low.

18. The method of claim 15, further comprising:
    measuring an effect of the stimulation.

19. The method of claim 15, further comprising:
    increasing stimulation frequency over the duration of the stimulation phase.

20. The method of claim 19, further comprising:
    reducing stimulation frequency after a predetermined time period.

* * * * *